(12) United States Patent
Labarthe et al.

(10) Patent No.: US 11,866,185 B2
(45) Date of Patent: Jan. 9, 2024

(54) ELECTRIC PROPULSION SYSTEM OF AN AIRCRAFT

(71) Applicants: Airbus SAS, Blagnac (FR); Airbus Operations SAS, Toulouse (FR)

(72) Inventors: Christophe Labarthe, Toulouse (FR); Franck Alvarez, Toulouse (FR); Fabien Latourelle, Toulouse (FR); Olivier Verseux, Toulouse (FR); Pascal Pome, Toulouse (FR); Jean Francois Allias, Toulouse (FR); Olivier Ciet, Toulouse (FR); Olivier Raspati, Toulouse (FR); Anthony Roux, Toulouse (FR); Benedikt Bammer, Taufkirchen (DE)

(73) Assignees: AIRBUS SAS, Blagnac (FR); AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/701,818

(22) Filed: Mar. 23, 2022

(65) Prior Publication Data

US 2022/0306306 A1 Sep. 29, 2022

(30) Foreign Application Priority Data

Mar. 29, 2021 (FR) ........................ 2103181

(51) Int. Cl.
*F02K 5/00* (2006.01)
*B64D 27/24* (2006.01)
(Continued)

(52) U.S. Cl.
CPC .............. *B64D 27/24* (2013.01); *B60L 50/70* (2019.02); *B60L 58/33* (2019.02); *B64C 11/00* (2013.01);
(Continued)

(58) Field of Classification Search
CPC .... F02C 7/22; F02C 7/222; F02C 7/04; F02C 7/042; F02C 7/18; F02C 7/185; F02C 7/32; F02C 7/141; F02C 7/14; F02K 3/06
See application file for complete search history.

(56) References Cited

U.S. PATENT DOCUMENTS 2,214,669 A * 9/1940 Copley ................ B64D 33/08
123/54.2
7,419,364 B2 * 9/2008 Ramstein ............... F02C 7/042
416/246

(Continued)

FOREIGN PATENT DOCUMENTS

| EP | 3480114 A1 | 5/2019 |
| WO | 2021115660 A1 | 6/2021 |
| WO | 2021148744 A1 | 7/2021 |

OTHER PUBLICATIONS

French Search Report; priority document.

*Primary Examiner* — Thuyhang N Nguyen
(74) *Attorney, Agent, or Firm* — Greer, Burns & Crain, Ltd.

(57) ABSTRACT

A propulsion system includes a system for producing electricity that supplies electricity to at least one electric motor to which is mechanically coupled a propeller situated near a first longitudinal end of a nacelle that houses at least the system for producing electricity and the at least one electric motor. An air circulation channel, which receives a heat exchanger provided to allow the system for producing electricity to be cooled, extends inside the nacelle from a first end of the air circulation channel situated at the first longitudinal end of the nacelle. A part of the air circulation channel that is contiguous with its first end is delimited by an outer surface of cylindrical shape that surrounds the longitudinal axis of the nacelle.

15 Claims, 6 Drawing Sheets

(51) Int. Cl.
  *B60L 50/70*   (2019.01)
  *B60L 58/33*   (2019.01)
  *B64C 11/00*   (2006.01)
  *B64D 29/00*   (2006.01)
  *B64D 33/08*   (2006.01)

(52) U.S. Cl.
  CPC ............ *B64D 29/00* (2013.01); *B64D 33/08* (2013.01); *F02K 5/00* (2013.01); *B60L 2200/10* (2013.01)

(56) References Cited

U.S. PATENT DOCUMENTS

| | | | |
|---|---|---|---|
| 10,774,741 B2* | 9/2020 | Sennoun | F02C 6/00 |
| 2004/0040312 A1* | 3/2004 | Hoffjann | H01M 8/04089 |
| | | | 60/784 |
| 2014/0119903 A1* | 5/2014 | Suciu | F01D 25/08 |
| | | | 415/177 |
| 2016/0312797 A1* | 10/2016 | Suciu | F01D 25/12 |
| 2017/0021937 A1* | 1/2017 | Bustillo | B64D 33/10 |
| 2017/0167438 A1* | 6/2017 | Miller | F02K 1/72 |
| 2017/0268409 A1* | 9/2017 | Thomassin | B64C 9/38 |
| 2019/0128570 A1 | 5/2019 | Moxon | |
| 2020/0277069 A1 | 9/2020 | Rainville et al. | |
| 2020/0277076 A1 | 9/2020 | Becker et al. | |

\* cited by examiner

ELECTRIC PROPULSION SYSTEM OF AN AIRCRAFT

CROSS-REFERENCES TO RELATED APPLICATIONS

This application claims the benefit of the French patent application No. 2103181 filed on Mar. 29, 2021, the entire disclosures of which are incorporated herein by way of reference.

BACKGROUND OF THE INVENTION

The invention relates to the field of electric propulsion of aircraft. An aircraft with electric propulsion has, for example, electric propulsion systems attached to its wings. Such an electric propulsion system generally has a propeller driven in rotation by one or more electric motors that are supplied by a set of fuel cells. The electric motor(s) and the fuel cells are, for example, integrated in a nacelle. During operation, the fuel cells give off heat that should be evacuated. To this end, one solution uses a circuit for cooling the fuel cells, this circuit comprising a heat exchanger that is cooled by means of air from outside the aircraft that circulates in an air duct. The air from outside the aircraft enters the air duct through air inlets disposed on a lateral face of the nacelle and emerges therefrom through scoops or air outlets (exhausts) of the nacelle. The need to cool the fuel cells becomes greater the higher the thrust provided by the propulsion system, for example during take-off of the aircraft. However, the dimensioning of the circuit for cooling the fuel cells has to allow sufficient evacuation of the heat produced by the fuel cells in all the phases of use of the aircraft, and this proves to be complex, all the more so as impairing the aerodynamic performance of the aircraft should be avoided.

SUMMARY OF THE INVENTION

The present invention aims, in particular, to provide a solution to this problem. It relates to a propulsion system of an aircraft, comprising:
  a system for producing electricity comprising a set of fuel cells;
  at least one electric motor supplied with electricity by at least some of the fuel cells;
  a propeller mechanically coupled to the at least one electric motor; and
  a nacelle housing at least the system for producing electricity and the at least one electric motor, the nacelle comprising an air circulation channel provided to allow the system for producing electricity to be cooled.

The propulsion system is noteworthy in that:
  the air circulation channel extends inside the nacelle from a first end of the air circulation channel that is situated at a first longitudinal end of the nacelle;
  at least a part of the air circulation channel that is contiguous with the first end of the air circulation channel is delimited by an outer surface of cylindrical shape that surrounds the longitudinal axis of the nacelle;
  the air circulation channel receives a heat exchanger provided to allow the system for producing electricity to be cooled; and
  the propeller is situated near the first longitudinal end of the nacelle.

The fact that the air circulation channel extends inside the nacelle from the first longitudinal end of the nacelle allows the circulation of air with a high flow rate in the air circulation channel, in order to meet the requirements for cooling the system for producing electricity so as to ensure its effectiveness. The fact that the at least a part of the air circulation channel that is contiguous with the first end of the air circulation channel is delimited by an outer surface of cylindrical shape that surrounds the longitudinal axis of the nacelle allows axial symmetry of the propulsion system. This makes it possible to minimize the effects of choking and therefore the aerodynamic drag of the nacelle, by optimizing the pressure drops that are due to the cooling of the system for producing electricity. Thus, the propulsion system according to the invention makes it possible to meet the requirements for cooling the system for producing electricity while at the same time retaining satisfactory aerodynamic drag characteristics.

According to various embodiments that may be taken in isolation or in combination:
  in at least a part of the nacelle, considered along the length of the nacelle, there is only one air circulation channel, which is of circular section and houses a fan provided to promote the circulation of air in this air circulation channel Preferably, this circular section is centered on the longitudinal axis of the nacelle;
  the fan is housed in the air circulation channel, between the first end of the air circulation channel and the heat exchanger;
  the propeller is mounted so as to be able to rotate about the nacelle;
  the propulsion system comprises a device for adjusting the air flow rate, which is associated with the first end of the air circulation channel;
  the propeller is mounted secured to a drive shaft of which the longitudinal axis corresponds to the longitudinal axis of the nacelle;
  the heat exchanger is installed in a part of the air circulation channel in which a section of the air circulation channel on a plane perpendicular to the longitudinal axis of the nacelle is in the shape of a ring;
  the heat exchanger is installed in a part of the air circulation channel in which the air circulation channel is of circular section;
  the air circulation channel is of cylindrical shape and extends along the length of the nacelle, between the first end of the air circulation channel and a second end of the air circulation channel that opens near a second longitudinal end of the nacelle, which is opposite the first longitudinal end of the nacelle;
  a second end of the air circulation channel opens through a lateral wall of the nacelle, between the first longitudinal end of the nacelle and a second longitudinal end of the nacelle, which is opposite the first longitudinal end of the nacelle;
  the propulsion system has a hydrogen reservoir housed in the nacelle between the second end of the air circulation channel and the second longitudinal end of the nacelle;
  the propulsion system comprises a device for adjusting the air flow rate, which is associated with the second end of the air circulation channel;
  the first longitudinal end of the nacelle corresponds to a front longitudinal end of the nacelle;
  the first longitudinal end of the nacelle corresponds to a rear longitudinal end of the nacelle;

the propulsion system comprises two propellers mounted so as to be able to counter-rotate near one another;

in addition to the propeller, the propulsion system comprises a set of blades that is mounted fixedly with respect to the nacelle, near the propeller.

The invention also relates to an aircraft comprising such a propulsion system.

BRIEF DESCRIPTION OF THE DRAWINGS

The invention will be better understood upon reading the following description and studying the appended figures.

DETAILED DESCRIPTION OF THE PREFERRED EMBODIMENTS

Figure 1:
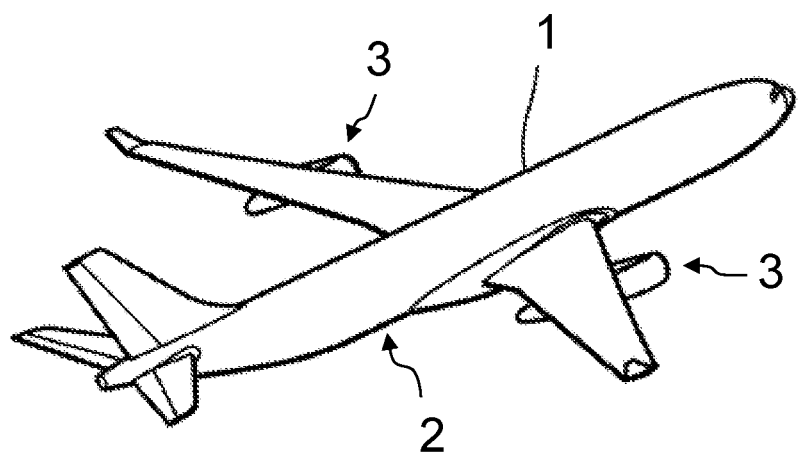
FIG. 1 illustrates an aircraft equipped with a propulsion system according to one embodiment of the invention.

The aircraft 1 shown in FIG. 1 comprises a fuselage 2 and propulsion systems 3. In the example illustrated in the figure, the propulsion systems are fastened beneath wings of the aircraft. However, this feature does not limit the invention, which also covers other arrangements of the propulsion systems, which can, in particular, be fastened on the wings of the aircraft, integrated in the wings, fastened to the fuselage, etc.

An aircraft propulsion system 3, as illustrated in FIGS. 2A to 5B, comprises a nacelle 20 that houses a system for producing electricity 10, which comprises a set of fuel cells 15 that are labelled FC in the figure (for "fuel cells") and also a set 14 of equipment auxiliary to the fuel cells, which is labelled BOP in the figure (for "balance of plant"). The nacelle 20 also houses at least one electric motor 16 supplied with electricity by at least some of the fuel cells (by electrical connections that are not shown in the figures). The nacelle comprises an air circulation channel 22 provided to allow the system for producing electricity 10 to be cooled. The air circulation channel receives a heat exchanger 30 provided to allow the system for producing electricity 10 to be cooled. The air circulation channel 22 extends inside the nacelle 20 from a first end 25 of the air circulation channel that is situated at a first longitudinal end 24 of the nacelle. At least a part of the air circulation channel 22, which is contiguous with the first end 25 of the air circulation channel, is delimited by an outer surface 28 of cylindrical shape that surrounds the longitudinal axis X of the nacelle 20. This cylindrical shape preferably corresponds to a cylinder with a circular base (cylinder of revolution) or an elliptical base. This makes it possible to have symmetry of the nacelle 20 with respect to its longitudinal axis X in order to minimize the drag of the nacelle. The propulsion system 3 also comprises a propeller 18 mechanically coupled to the at least one electric motor 16. This propeller is situated near the first longitudinal end 24 of the nacelle. In particular, without limiting the invention, the propeller 18 can be mechanically coupled to the at least one electric motor 16 via a reduction gear or a gearbox.

Advantageously, in at least a part 35 of the nacelle, considered along the length of the nacelle, there is only one air circulation channel 22, which is of circular section and houses a fan 12 provided to promote the circulation of air in this air circulation channel Preferably, as shown in the figures, this circular section is centered on the longitudinal axis of the nacelle. In particular, the fan 12 is housed in the air circulation channel 22, between the first end 25 of the air circulation channel and the heat exchanger 30.

Again advantageously, the nacelle 20 houses a reservoir 40 of dihydrogen H2, also called hydrogen in the rest of the description. In particular, the hydrogen is stored in the liquid state in the reservoir 40, labelled LH2 in the figures. The hydrogen contained in the reservoir 40 allows the fuel cells 15 to be supplied with hydrogen. However, without departing from the scope of the invention, the propulsion system 3 might not comprise such a hydrogen reservoir. The fuel cells 15 are then supplied with hydrogen from a hydrogen reservoir outside the propulsion system 3, for example a hydrogen reservoir located in the fuselage 2 or in a wing of the aircraft.

In the various figures, the dashed arrows illustrate the direction of circulation of the air in the air circulation channel 22. The thick arrows, referenced by the symbol F and parallel to the longitudinal axis X of the nacelle 20, illustrate the orientation of the nacelle 20 when it is installed on an aircraft 1: the head of an arrow F indicates the front of the nacelle (on the left in the figures) when the aircraft is in flight. The length of the nacelle extends between its first longitudinal end 24 and a second longitudinal end 26. In the rest of the description, the concepts of front and rear are expressed with respect to the direction of forward movement of the aircraft 1 when it is in flight.

Figure 2A:
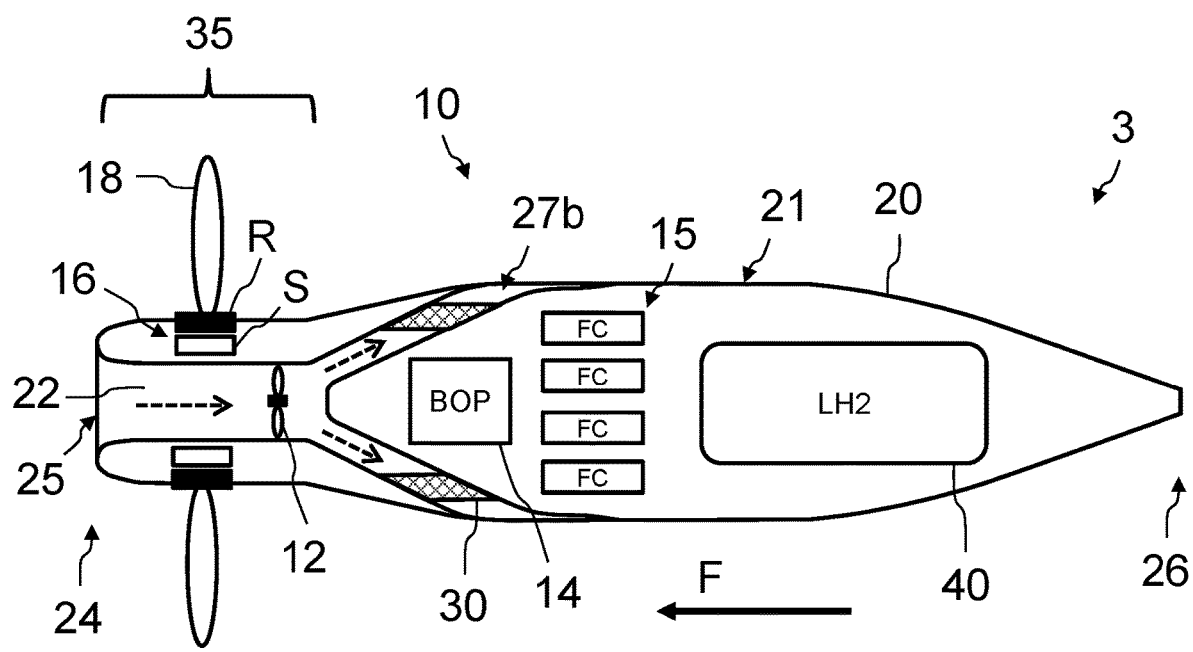
FIG. 2A schematically illustrates, viewed in longitudinal cross section, an aircraft propulsion system according to a first embodiment of the invention.
Figure 2B:
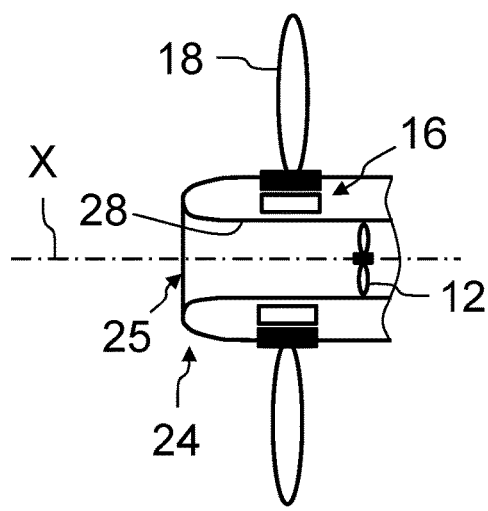
FIG. 2B is a detail view of the aircraft propulsion system illustrated in FIG. 2A.
Figure 4A:
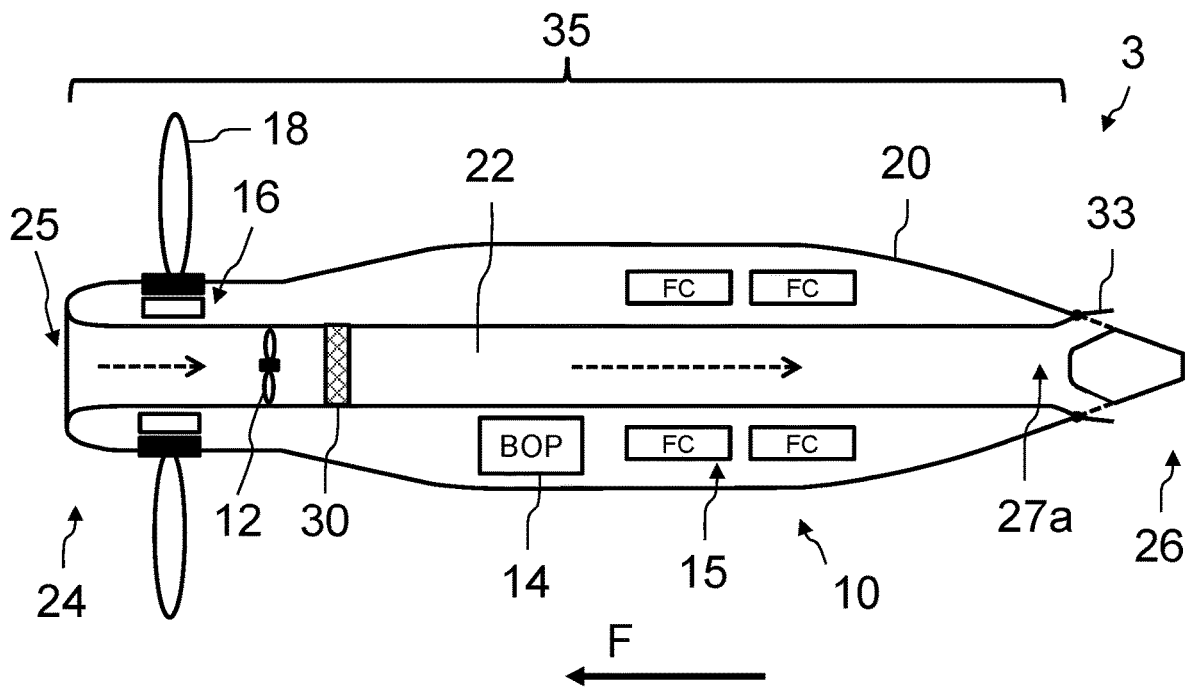
FIG. 4A schematically illustrates, viewed in longitudinal cross section, an aircraft propulsion system, according to a third embodiment of the invention.
Figure 4B:
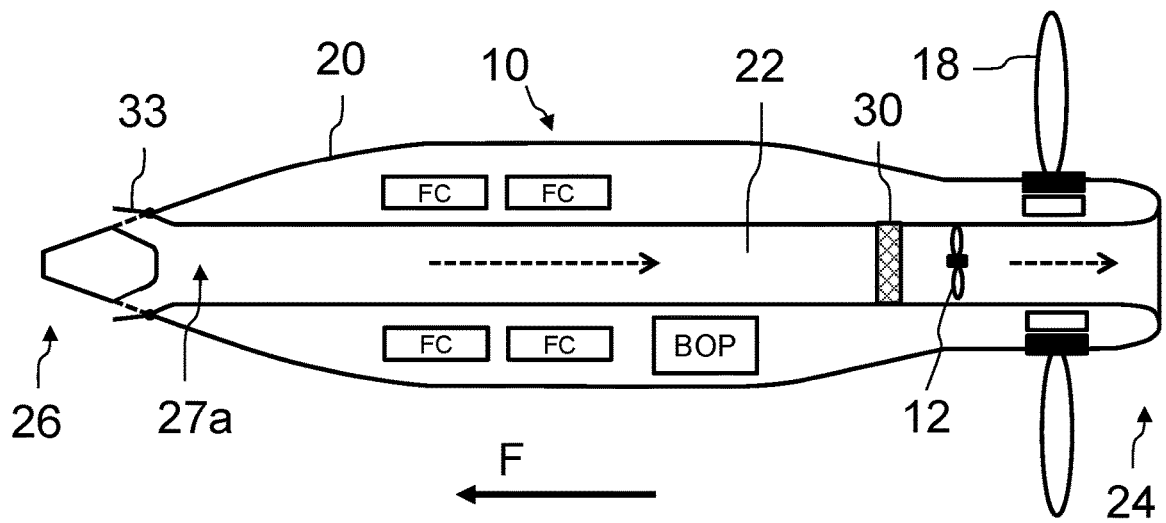
FIG. 4B schematically illustrates an aircraft propulsion system according to variant of the third embodiment of the invention.

In the first embodiment, illustrated in FIG. 2A, and the third embodiment, illustrated in FIG. 4A, the propeller 18 is mounted so as to be able to rotate about the nacelle 20, near its first longitudinal end 24. The electric motor (or a set of electric motors) 16 is disposed in the shape of a ring at the periphery of the nacelle (in a plane perpendicular to the longitudinal axis X of the nacelle). A stator S of the motor 16 is as one with the nacelle. Blades of the propeller 18 are as one with a rotor R that is designed to rotate around the stator S during operation of the motor 16. This arrangement of the propeller 18 and of the electric motor 16 has the advantage of not requiring integration of any drive element inside the first end 25 of the air circulation channel 22 that is thus completely free for the circulation of the air.

In a variant that is not shown in the figure, the blades of the propeller are mounted secured to a ring that is mounted so as to be able to rotate about the nacelle. This ring is mechanically coupled to the at least one motor 16 by a gear system.

Figure 2C:
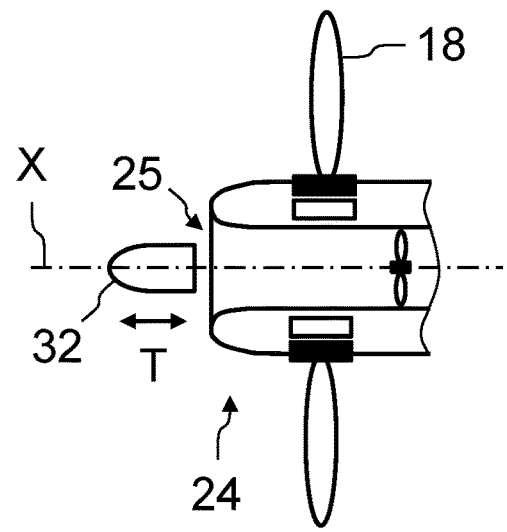
FIG. 2C, which is similar to FIG. 2B, schematically illustrates a particular embodiment of the aircraft propulsion system according to the first embodiment of the invention.
Figure 2D:
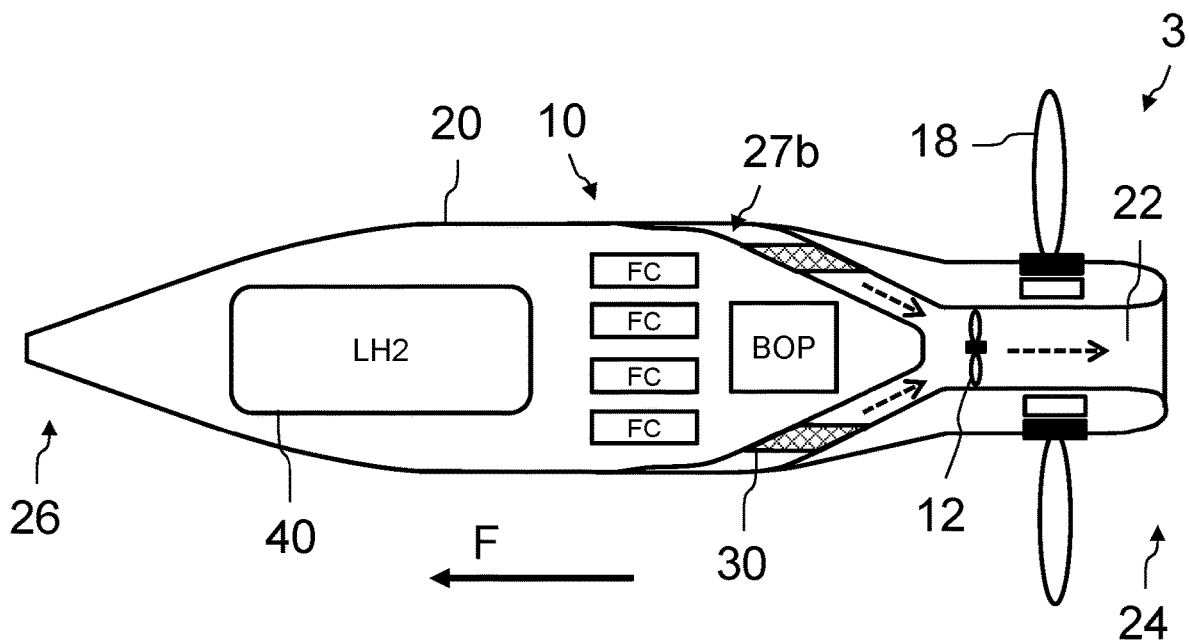
FIG. 2D schematically illustrates an aircraft propulsion system according to variant of the first embodiment of the invention.

In an advantageous embodiment illustrated in FIG. 2C, the propulsion system 3 comprises a device 32 for adjusting the air flow rate that is associated with the first end 25 of the air circulation channel 22. This device 32 is configured to be moved in translation along the longitudinal axis X of the nacelle 20, as illustrated by the bidirectional arrow T. The position of the device 32 is controlled so as to optimize the flow of cooling air in the air circulation channel 22 in accordance with the need for cooling, in order to minimize the aerodynamic drag of the nacelle as much as possible. The mechanical connections between the device 32 and the nacelle are not shown in the figure. A translation (towards the right in the figure) of the device 32 that has the effect of bringing it closer to the first end 25 of the air circulation channel 22 makes it possible to reduce the flow rate of air in the air circulation channel 22. A translation (towards the left in the figure) of the device 32 that has the effect of moving it away from the first end 25 of the air circulation channel 22 makes it possible to increase the flow rate of air in the air circulation channel 22. The device 32 for adjusting the air flow rate corresponds, for example, to a plug or spinner provided to partially close off the first end 25 of the air circulation channel 22 when it is moved closer to the end.

Figure 3A:
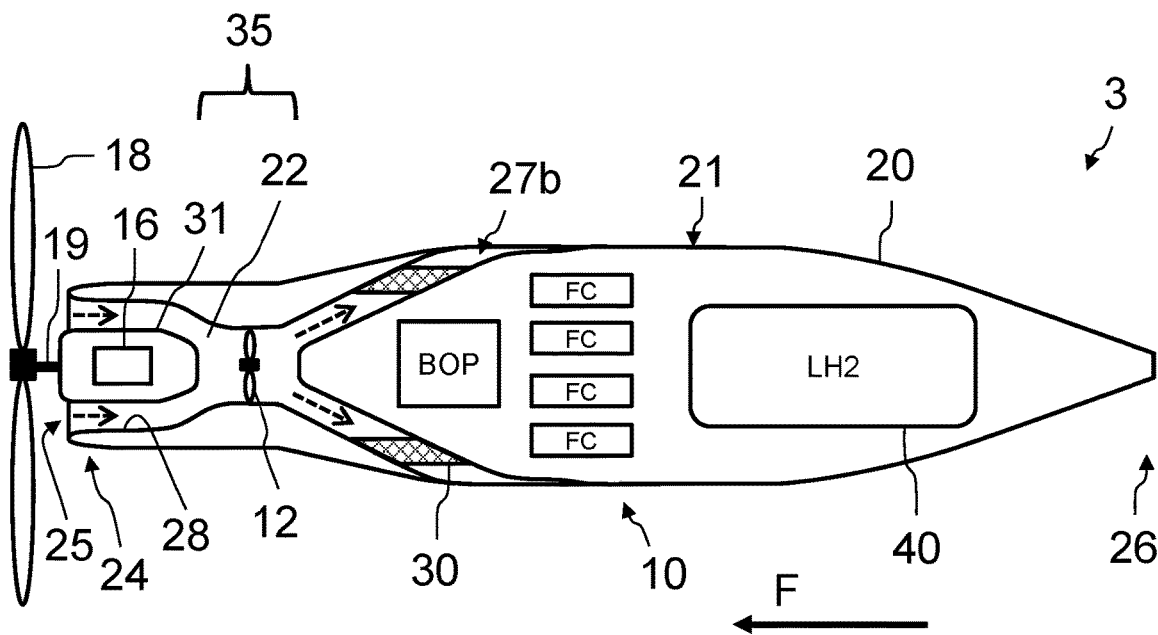
FIG. 3A schematically illustrates, viewed in longitudinal cross section, an aircraft propulsion system, according to a second embodiment of the invention.
Figure 3B:
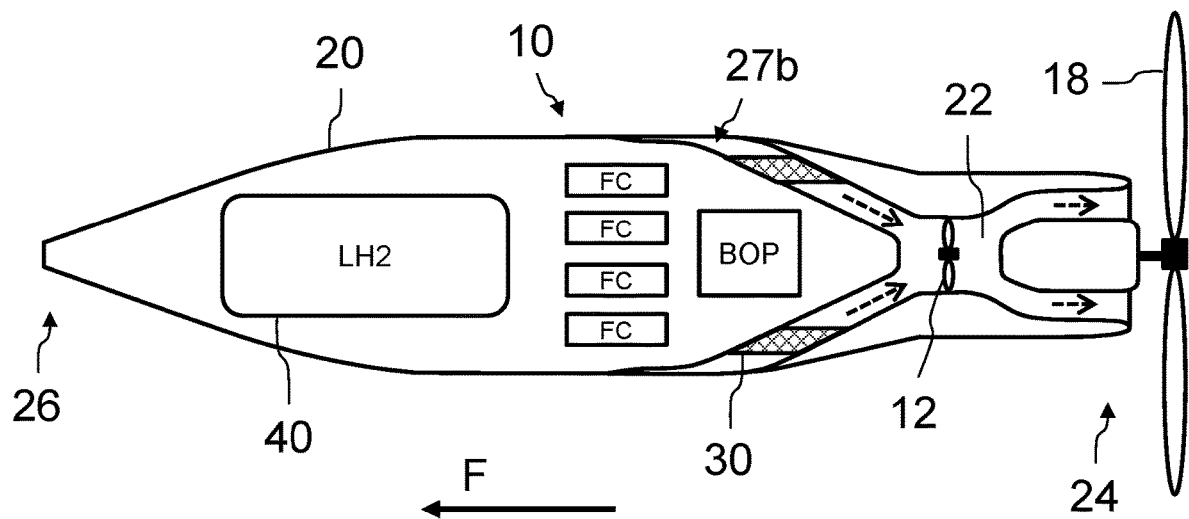
FIG. 3B schematically illustrates an aircraft propulsion system, according to variant of the second embodiment of the invention.
Figure 5A:
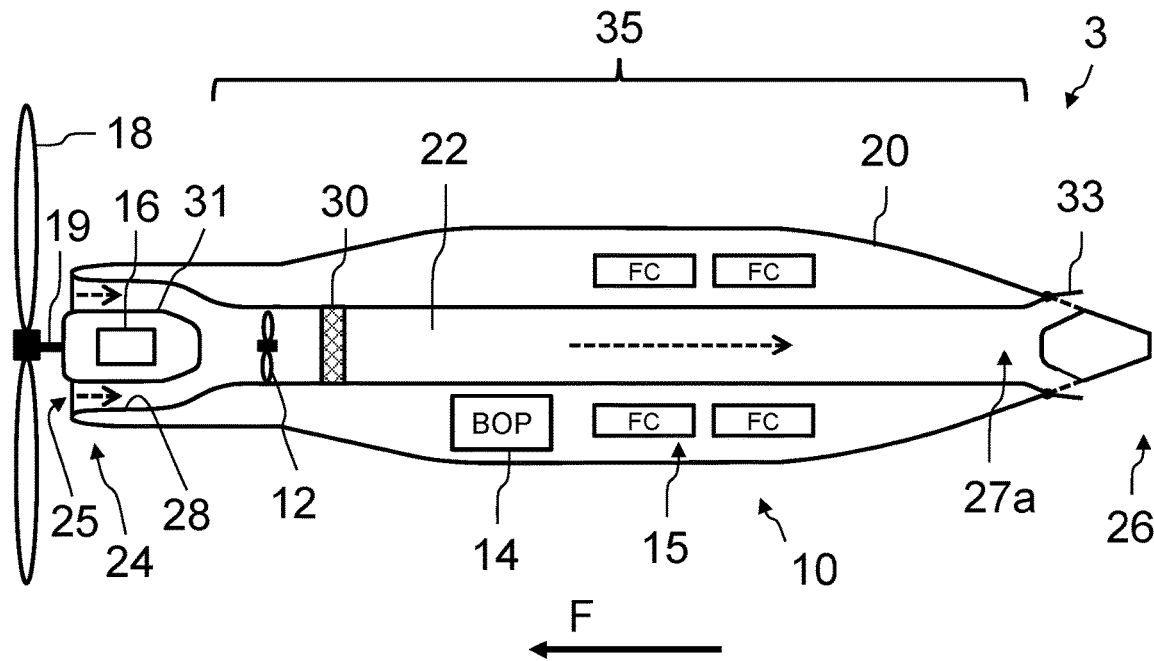
FIG. 5A schematically illustrates, viewed in longitudinal cross section, an aircraft propulsion system according to a fourth embodiment of the invention.
Figure 5B:
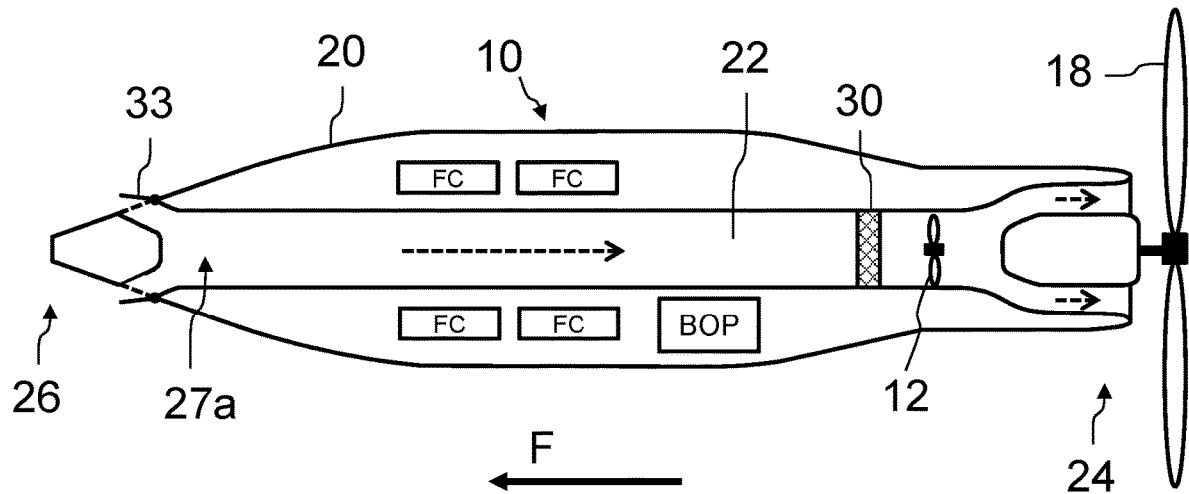
FIG. 5B schematically illustrates an aircraft propulsion system according to variant of the fourth embodiment of the invention.

In the second embodiment, illustrated in FIG. 3A, and the fourth embodiment, illustrated in FIG. 5A, the propeller 18 is mounted secured to a drive shaft 19 of which the longitudinal axis corresponds to the longitudinal axis X of the nacelle 20. The drive shaft 19 is mechanically coupled to the at least one electric motor 16, which is integrated in a drive system 31. In one particular embodiment, the drive system 31 further comprises a gearbox that is not shown in the figures. When the propulsion system 3 comprises a plurality of electric motors 16, the drive shaft 19 is coupled mechanically to these electric motors via the gearbox.

The drive system 31 is mounted at least in part inside the nacelle 20, at its first end 24, centered on the longitudinal axis X of the nacelle. Thus, the first end 25 of the air circulation channel 22 is such that the outer surface 28 of the air circulation channel 22, which is of cylindrical shape, surrounds the drive system 31. Advantageously, the drive system 31 has a fairing provided to make it easier for the air to flow along the drive system. When the outer surface 28 of the air circulation channel 22 is of circular cylindrical shape, a section of the air circulation channel 22 on a plane perpendicular to the longitudinal axis X of the nacelle is then in the shape of a ring. At its first end 25, the air circulation channel is then between its outer surface 28 on the one hand and the drive system 31 on the other hand. In order not to overcomplicate the figures, the mechanical connections between the drive system 31 and the nacelle are not shown. In operation, the rotation of the propeller 18 promotes the introduction of air into the first end 25 of the air circulation channel 22. The air circulates in the air circulation channel 22, between the outer surface 28 that is of cylindrical shape and the drive system 31. The air then arrives in the part 35 of the air circulation channel 22 in which there is only one air circulation channel 22, which is of circular section and comprises the fan 12. The fan 12 promotes the circulation of the air in the air circulation channel.

In the first embodiment, illustrated in FIG. 2A, and the second embodiment, illustrated in FIG. 3A, a second end 27b of the air circulation channel 22 opens through a lateral wall 21 of the nacelle, between the first longitudinal end 24 of the nacelle and a second longitudinal end 26 of the nacelle, which is opposite the first longitudinal end of the nacelle. The second end 27b is, for example, in the shape of a scoop. The heat exchanger 30 is installed between the part 35 of the air circulation channel 22 and its second end 27b. In a first alternative, the second end 27b of the air circulation channel 22 extends substantially over the entire perimeter of the lateral wall 21 of the nacelle. The heat exchanger 30 is then installed in a part of the air circulation channel 22 in which a section of the air circulation channel on a plane perpendicular to the longitudinal axis of the nacelle is in the shape of a ring. In a second alternative, the air circulation channel 22 comprises a plurality of independent branches between its part 35 and its second end 27b. The second end 27b then has a plurality of independent parts distributed around the perimeter of the lateral wall 21 of the nacelle. The various independent parts each correspond to one of the branches of the air circulation channel 22 and they are preferably distributed symmetrically over the perimeter of the lateral wall 21 of the nacelle. The heat exchanger 30 then comprises a plurality of parts disposed in the various branches of the air circulation channel 22. In one variant, the heat exchanger 30 is installed in a part of the air circulation channel in which the air circulation channel is of circular section, for example in the part 35.

When the nacelle 20 houses a hydrogen reservoir 40, this hydrogen reservoir is, for example, housed in a part of the nacelle that is between the second end 27b of the air circulation channel 22 and the second longitudinal end 26 of the nacelle. In particular, as shown in FIGS. 2A and 3A, the set of fuel cells 15 and the set 14 of auxiliary equipment are also housed in the part of the nacelle that is between the second end 27b of the air circulation channel 22 and the second longitudinal end 26 of the nacelle.

In particular, without limiting the invention, the propulsion system 3 comprises a device for adjusting the air flow rate, which is not shown in the figures, associated with the second end 27b of the air circulation channel 22. This device for adjusting the air flow rate corresponds, for example, to a set of flaps of which the position can be regulated so as to vary the flow rate of air in the air circulation channel 22, in particular, in accordance with the need to cool the system for producing electricity 10.

In the third embodiment, illustrated in FIG. 4A, the air circulation channel is of cylindrical shape and extends along the length of the nacelle, between the first end 25 of the air circulation channel 22 and a second end 27a of the air circulation channel that opens near a second longitudinal end 26 of the nacelle, which is opposite the first longitudinal end 24 of the nacelle. When this cylindrical shape is of circular section, the part 35 of the air circulation channel 22 then extends over almost the entire length of the nacelle 20. The heat exchanger 30 is then of circular section. The cylindrical shape of the air circulation channel 22 makes it possible to promote the flow of the air in this air circulation channel and consequently to improve the cooling of the system for producing electricity 10. Advantageously, the propulsion system 3 comprises a device 33 for adjusting the air flow rate that is associated with the second end 27a of the air circulation channel 22. This device 33 for adjusting the air flow rate corresponds, for example, to a set of flaps of which the position can be regulated so as to vary the flow rate of air in the air circulation channel 22, in particular in accordance with the need to cool the system for producing electricity 10. The fuel cells 15 and the set 14 of auxiliary equipment are housed in the nacelle around the air circulation channel 22, between the air circulation channel 22 and the lateral wall 21 of the nacelle.

In the fourth embodiment, illustrated in FIG. 5A, the air circulation channel 22 is similar to that of the third embodiment, except as regards the first end 25 that has already been described.

In FIGS. 2A, 3A, 4A and 5A, which have already been described, the first end 24 of the nacelle corresponds to the front of the nacelle and the second end 26 corresponds to the rear of the nacelle. The propeller 18 is therefore situated near the front of the nacelle. In operation, the air enters the air circulation channel 22 through the first end 25 and emerges therefrom through the second end 27a or 27b. The air emerges through the second end 27a or 27b after having been heated by the heat exchanger 30, and this makes it possible to create an auxiliary thrust, in addition to the main thrust produced by the propeller.

FIGS. 2B, 3B, 4B and 5B correspond to variants of the embodiments illustrated in FIGS. 2A, 3A, 4A and 5A, in which the first end 24 of the nacelle corresponds to the rear of the nacelle and the second end 26 corresponds to the front of the nacelle. The propeller 18 is therefore situated near the rear of the nacelle. In operation, the air enters the air circulation channel 22 through the second end 27a or 27b and emerges therefrom through the first end 25. The air emerges through the first end 25 after having been heated by the heat exchanger 30, and this makes it possible to create an auxiliary thrust, in addition to the main thrust produced by the propeller.

In a particular embodiment, the propulsion system 3 comprises two propellers mounted so as to be able to counter-rotate near one another.

In another embodiment, in addition to the propeller 18, the propulsion system 3 comprises a set of blades that is mounted fixedly with respect to the nacelle, near the propeller.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system of an aircraft, comprising:
   a system for producing electricity comprising a set of fuel cells;
   at least one electric motor supplied with electricity by at least some of the fuel cells;
   a propeller mechanically coupled to the at least one electric motor and driven only by the at least one electric motor; and
   a nacelle housing at least the system for producing electricity and the at least one electric motor, said nacelle comprising an air circulation channel provided to allow the system for producing electricity to be cooled,
   wherein the propeller is external to the nacelle,
   wherein the air circulation channel extends inside the nacelle from a first end of said air circulation channel, that is situated at a first longitudinal end of the nacelle, to a second end of the air circulation channel located between the first longitudinal end of the nacelle and a second longitudinal end of the nacelle, the air circulation channel having an opening in a lateral wall of the nacelle between the first longitudinal end of the nacelle and the second longitudinal end of the nacelle, such that an entirety of the flow of air within said air circulation channel flows through the opening in the lateral wall of the nacelle and through the first longitudinal end of the nacelle;
   wherein at least a part of the air circulation channel that is contiguous with the first end of the air circulation channel is delimited by an outer surface of cylindrical shape that surrounds a longitudinal axis of the nacelle;
   wherein the air circulation channel receives a heat exchanger provided to allow the system for producing electricity to be cooled; and
   wherein the propeller is situated near the first longitudinal end of the nacelle.

2. The propulsion system according to claim 1, wherein in at least a part of the nacelle, considered along a length of the nacelle, there is only one air circulation channel, which is of circular section centered on the longitudinal axis of the nacelle and houses a fan provided to promote a circulation of air in the air circulation channel.

3. The propulsion system according to claim 2, wherein the fan is housed in the air circulation channel, between the first end of the air circulation channel and the heat exchanger.

4. The propulsion system according to claim 1, wherein the propeller is mounted to be able to rotate about the nacelle.

5. The propulsion system according to claim 1, further comprising a device to adjust an air flow rate, which is associated with the first end of the air circulation channel.

6. The propulsion system according to claim 1, wherein the propeller is mounted secured to a drive shaft of which a longitudinal axis corresponds to the longitudinal axis of the nacelle.

7. The propulsion system according to claim 1, wherein the heat exchanger is installed in a part of the air circulation channel in which a section of the air circulation channel on a plane perpendicular to the longitudinal axis of the nacelle is shaped as a ring.

8. The propulsion system according to claim 1, wherein the heat exchanger is installed in a part of the air circulation channel in which the air circulation channel is of circular section.

9. The propulsion system according to claim 8, wherein the air circulation channel is of cylindrical shape and extends along a length of the nacelle, between the first end of the air circulation channel and a second end of the air circulation channel that opens near a second longitudinal end of the nacelle, which is opposite the first longitudinal end of the nacelle.

10. The propulsion system according to claim 1, wherein the second end of the air circulation channel opens through the lateral wall of the nacelle, between the first longitudinal end of the nacelle and the second longitudinal end of the nacelle, which is opposite the first longitudinal end of the nacelle.

11. The propulsion system according to claim 10, further comprising a hydrogen reservoir housed in the nacelle between the second end of the air circulation channel and the second longitudinal end of the nacelle.

12. The propulsion system according to claim 1, further comprising a device for adjusting an air flow rate, which is associated with a second end of the air circulation channel.

13. The propulsion system according to claim 1, wherein the first longitudinal end of the nacelle corresponds to a front longitudinal end of the nacelle.

14. The propulsion system according to claim 1, wherein the first longitudinal end of the nacelle corresponds to a rear longitudinal end of the nacelle.

15. An aircraft comprising a propulsion system according to claim 1.

* * * * *